United States Patent
Ohshima

(10) Patent No.: US 10,866,483 B2
(45) Date of Patent: Dec. 15, 2020

(54) OPTICAL SWITCHING DEVICE

(71) Applicant: JVCKENWOOD Corporation, Yokohama (JP)

(72) Inventor: Katsunori Ohshima, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/585,466

(22) Filed: Sep. 27, 2019

(65) Prior Publication Data
US 2020/0103724 A1 Apr. 2, 2020

(30) Foreign Application Priority Data

Sep. 28, 2018 (JP) .................................. 2018-185093

(51) Int. Cl.
*G02F 1/31* (2006.01)
(52) U.S. Cl.
CPC .......... *G02F 1/31* (2013.01); *G02F 2201/123* (2013.01); *G02F 2201/34* (2013.01)
(58) Field of Classification Search
CPC ........................................................ G02F 1/31
See application file for complete search history.

(56) References Cited

U.S. PATENT DOCUMENTS

| 2003/0020856 A1* | 1/2003 | Furuhashi | G02F 1/133555 349/122 |
| 2003/0081161 A1* | 5/2003 | Ozawa | G02F 1/133555 349/115 |
| 2020/0096686 A1* | 3/2020 | Cool | G02B 5/208 |

FOREIGN PATENT DOCUMENTS

JP 2008158395 A 7/2008

* cited by examiner

*Primary Examiner* — Edmond C Lau
(74) *Attorney, Agent, or Firm* — Nath, Goldberg & Meyer; Jerald L. Meyer

(57) ABSTRACT

An optical switching device includes a drive substrate, a transparent substrate, a liquid crystal layer, and a reflection enhancing film. The drive substrate includes a pixel region including a plurality of pixel electrodes, an outer circumferential region arranged at an outer circumference of the pixel region, and a seal region. The transparent substrate includes a counter electrode. The liquid crystal layer is interposed between the drive substrate and the transparent substrate. The reflection enhancing film is arranged on the pixel region, the outer circumferential region, and the seal region. The reflection enhancing film includes at least one assembly of dielectric films to be stacked, each assembly being a set of two dielectric films having different refractive indexes. The dielectric film as the first layer included in the reflection enhancing film has a different thickness from other dielectric films.

2 Claims, 2 Drawing Sheets

OPTICAL SWITCHING DEVICE

CROSS REFERENCE TO RELATED APPLICATION

This application is based upon and claims the benefit of priority under 35 U.S.C. § 119 from Japanese Patent Application No. 2018-185093, filed on Sep. 28, 2018, the entire contents of which are incorporated herein by reference.

BACKGROUND

The present disclosure relates to a structure of a reflection enhancing film in an optical switching device.

Ring-like optical network systems and optical wavelength multiplex systems are recently proposed to deal with a markedly-increasing amount of information in the field of optical communication. Such an optical communication system uses a reconfigurable optical add-drop multiplexer (ROADM) capable of branching or adding optical signals without being converted to electronic signals or translated.

An example of optical switching apparatuses used in a ROADM is a wavelength selective switch (WSS). The WSS selects predetermined wavelengths from an optical signal having a plurality of wavelengths, and allots the predetermined wavelengths to predetermined input/output ports so as to input/output multiplexed wavelengths. Examples of optical switching devices used in such a WSS include a micro electro mechanical systems (MEMS) mirror, and a liquid crystal on silicon (LCOS) device.

The LCOS device is a reflective liquid crystal device having a pixel region in which a plurality of reflective pixel electrodes are arranged in a horizontal direction and in a perpendicular direction. A refractive index of a liquid crystal on each pixel electrode varies when a voltage applied to the liquid crystal is controlled per pixel electrode. A phase velocity of a signal light is controlled per pixel such that the refractive index of the liquid crystal on each pixel electrode is changed.

The LCOS device changes the phase velocity per pixel in a step wise, so as to control an inclination angle of a wave surface of the signal light in accordance with a ratio of a change in the phase velocity. Namely, the LCOS device functions as a phase modulation device that changes the phase velocity per pixel to cause the signal light to be reflected in a predetermined direction.

The plural pixel electrodes are provided thereon with dielectric films having different refractive indexes alternately stacked on one another to compose a reflection enhancing film for enhancing a reflectance due to the effects of interference of light, so as to allow wavelengths of the signal light to be reflected effectively. Technology regarding reflection enhancing films is well known that alternately stacks dielectrics having a high refractive index and dielectrics having a low refractive index, each set to have a preferred thickness (optical thickness=λ/4) at a targeted wavelength λ, so as to achieve the effects of enhancing the reflection of light from the interfaces of the respective dielectrics due to the interference of light.

A conventional reflection enhancing film is formed such that low dielectric films and high dielectric films each having a thickness corresponding to a wavelength of a signal light are stacked on one another. When a targeted wavelength of the signal light is changed, a new reflection enhancing film needs to be manufactured with a thickness corresponding to the changed wavelength.

JP 2008-158395 discloses an example of a phase modulation apparatus using an LCOS device. JP 2008-158395 discloses a method of fabricating a reflection enhancing film by stacking high dielectric films and low dielectric films on pixel electrodes of the LCOS device. This prior art document discloses a configuration of the reflection enhancing film with respect to particular wavelengths, for example.

When the LCOS device is used as an optical switching device in a WSS device, the LCOS device reflects a signal light in a predetermined direction by phase modulation. The LCOS device used as an optical switching device needs to use a liquid crystal layer having a thickness of about 5 μm so as to ensure the phase modulation of 2π. The reflection enhancing film on a plurality of pixel electrodes arranged on a drive substrate includes about five pairs of dielectric films (10 layers) stacked on one another, resulting in a thickness of about 0.5 μm.

The thicknesses of the high dielectric films and the low dielectric films composing the reflection enhancing film in the LCOS device are each set to an optical thickness ((wavelength/4)/refractive index) capable of obtaining a reflected light due to the effects of interference of light most efficiently, depending on the wavelength of the signal light and the refractive index of each of the high dielectric films and the low dielectric films.

A step of forming the first layer in the reflection enhancing film is the final step of a semiconductor manufacturing process of manufacturing the drive substrate used in the LCOS device, and is typically undergone in a semiconductor wafer state. Subsequently, the rest of the dielectric films composing the reflection enhancing film are formed in the process of manufacturing the LCOS device. If a particular wavelength of plural wavelengths of the signal light incident on the LCOS device is required to be reflected more efficiently, the thickness of the reflection enhancing film needs to be changed. The drive substrate provided with the first layer is hindered from film removal or a change in film thickness through repairs, which is substantially unreasonable. Such circumstances typically lead the drive substrate to be disposed of, and have an influence on a material loss and a period necessary for the manufacture of the LCOS device accordingly.

SUMMARY

According to an aspect of the embodiments, there is provided an optical switching device including: a drive substrate including a pixel region including a plurality of pixel electrodes, an outer circumferential region arranged at an outer circumference of the pixel region, and a seal region; a transparent substrate including a counter electrode; a liquid crystal layer interposed between the drive substrate and the transparent substrate; and a reflection enhancing film arranged on the pixel region, the outer circumferential region, and the seal region, wherein the reflection enhancing film includes at least one assembly of dielectric films to be stacked, each assembly being a set of two dielectric films having different refractive indexes, and the dielectric film as a first layer in the reflection enhancing film has a different thickness from other dielectric films.

DETAILED DESCRIPTION

Embodiment

An optical switching device according to an embodiment of the present disclosure will be described below.

An example of a structure of the optical switching device is described below with reference to FIG. 1 to FIG. 4. The present embodiment is illustrated with a LCOS device of a reflective liquid crystal device used as the optical switching device.

Figure 1:
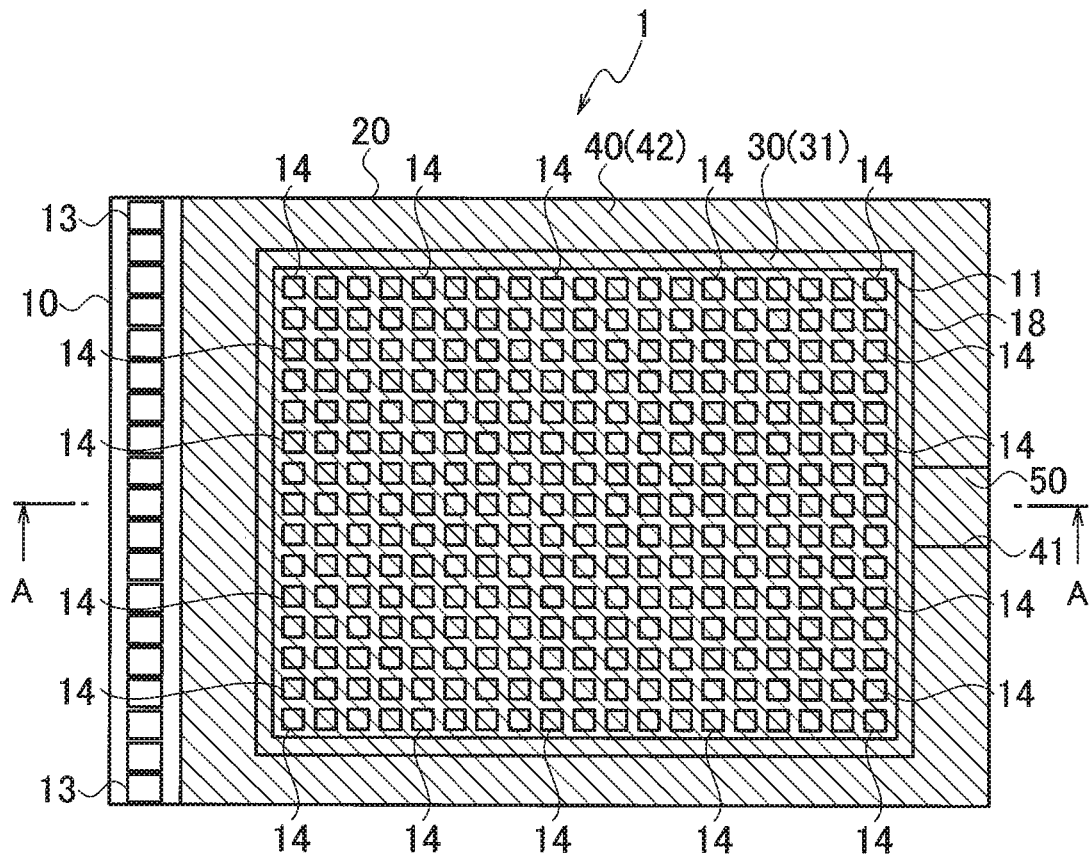
FIG. 1 is a top view of an optical switching device according to the present embodiment showing a region for forming a reflection enhancing film.
Figure 2:
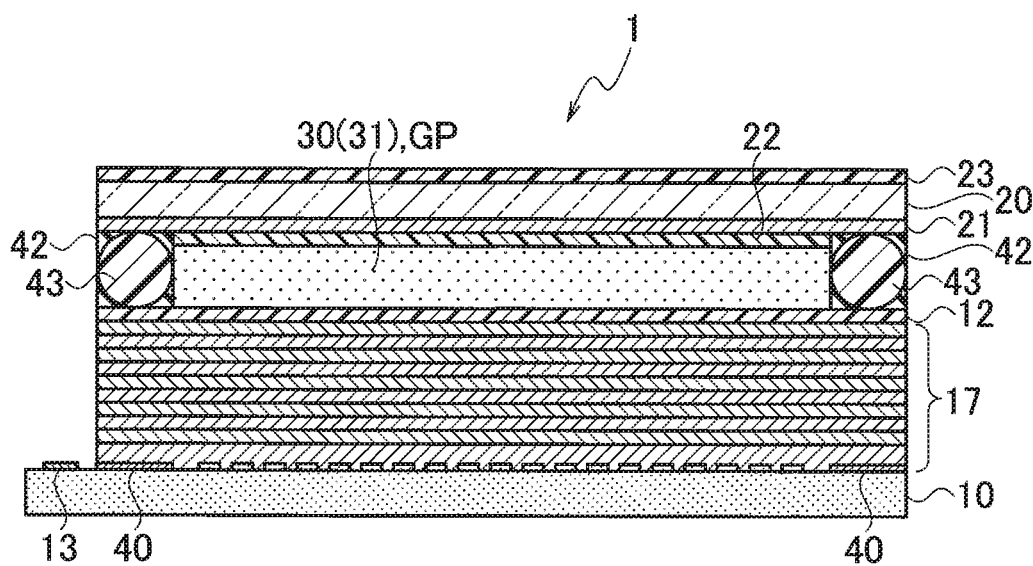
FIG. 2 is a cross-sectional view showing an example of a structure of the optical switching device according to the present embodiment.

As shown in FIG. 1 and FIG. 2, the optical switching device 1 includes a drive substrate 10, a transparent substrate 20, a liquid crystal 31 filled into a liquid crystal layer 30, a seal material 42 including a spacer material 43 applied to a seal region 40 and molded, and a sealant 50. The seal material 42 and the sealant 50 are a photo-curing resin, such as ultraviolet-curing resin. The seal material 42 and the sealant 50 may be either the same type or different types of photo-curing resin.

The drive substrate 10 includes a pixel region 11, an outer circumferential region 18, and the seal region 40. The pixel region 11 includes a plurality of light-reflective pixel electrodes 14 arranged in the horizontal direction and in the perpendicular direction. A single pixel electrode 14 corresponds to a single pixel. The outer circumferential region 18 surrounds the pixel region 11. The seal region 40 surrounds the outer circumferential region 18.

A reflection enhancing film 17 is formed at least on the pixel region 11 of the entire area including the pixel region 11, the outer circumferential region 18, and the seal region 40. An orientation film 12 is formed at least on the reflection enhancing film 17. A plurality of connection terminals 13 are formed at an outer circumferential part of the drive substrate 10.

The drive substrate 10 is a semiconductor substrate, in particular, a silicon substrate. The drive substrate 10 is provided with a drive circuit (not shown) for driving the respective pixels under the pixel electrodes 14. A material used for each of the pixel electrodes 14 and the connection terminals 13 may be aluminum or an aluminum alloy, for example.

The transparent substrate 20 includes a counter electrode 21 and an orientation film 22. The counter electrode 21 is arranged to correspond to the plural pixel electrodes 14. The orientation film 22 is formed on the counter electrode 21. The drive substrate 10 and the transparent substrate 20 are arranged such that the plural pixel electrodes 14 and the counter electrode 21 are opposed to each other.

The drive substrate 10 and the transparent substrate 20 are fixed by the seal material 42 and the sealant 50 with a gap GP provided therebetween. The liquid crystal layer 30 is provided in the gap GP between the drive substrate 10 and the transparent substrate 20. The liquid crystal layer 30 is formed on an assembly of the plural pixel electrodes 14, the reflection enhancing film 17, and the orientation film 12. An antireflection film 23 may be formed on the surface of the transparent substrate 20 opposite to the surface on which the counter electrode 21 is provided. The antireflection film 23 may be a dielectric multi-layer film.

The transparent substrate 20, the counter electrode 21, and the orientation film 22 have light transmission properties. The transparent substrate 20 may be a non-alkaline glass substrate or a quartz glass substrate. A material used for the counter electrode 21 may be indium tin oxide (ITO). A dielectric film having light transmission properties may be provided on both of the upper and lower sides of the ITO film.

The seal material 42 is applied and molded along the outer circumferential region 18 which is an outer circumference of the pixel region 11 so as to surround the pixel region 11 and the outer circumferential region 18. The seal material 42 is provided with a liquid crystal injection part 41. The liquid crystal layer 30 is formed such that the liquid crystal 31 is injected into the gap GP between the drive substrate 10 and the transparent substrate 20 through the liquid crystal injection part 41, and the liquid crystal injection part 41 is sealed by the sealant 50. A thickness of the liquid crystal layer 30 in the optical switching device 1 is 5 μm, for example.

A drive signal for driving the liquid crystal 31 is input to some of the connection terminals 13. The drive circuit provided in the drive substrate 10 applies a drive voltage based on the drive signal to the respective pixel electrodes 14. The liquid crystal 31 is thus driven per pixel in accordance with a potential difference between the respective pixel electrodes 14 and the counter electrode 21.

Figure 3:
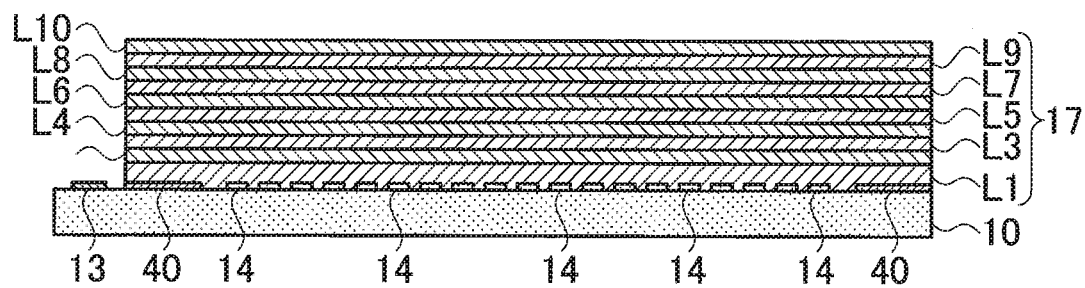
FIG. 3 is a cross-sectional view showing an example of a structure of the reflection enhancing film of the optical switching device according to the present embodiment.

The structure of the reflection enhancing film 17 provided on the pixel region 11, the outer circumferential region 18, and the seal region 40 is described in detail below. Since the plural pixel electrodes 14 are arranged in the pixel region 11 indicated by the oblique lines in FIG. 1, the pixel region 11 has an uneven surface with projections when only provided with the pixel electrodes 14. As shown in FIG. 3, the reflection enhancing film 17 is formed such that dielectric films including dielectrics (for example, silicon dioxide: $SiO_2$) are stacked on the pixel region 11, the outer circumferential region 18, and the seal region 40.

First, a $SiO_2$ film (L1) as the first film is formed on the pixel region 11, the outer circumferential region 18, and the seal region 40 by vacuum vapor deposition, for example. The $SiO_2$ film provided is a thin film having an uneven surface with projections conforming to the uneven surface of the pixel region 11 (the lower layer) only provided with the plural pixel electrodes 14. The first layer L1 may be formed in a wafer state in the middle of the semiconductor manufacture process of manufacturing the drive substrate 10.

The film obtained is flattened by chemical mechanical polishing (CMP) so as to have an even surface after the film formation. The flattening process is not limited to the chemical mechanical polishing, and may be performed by chemical etching, for example. The flattening process may be performed in a semiconductor wafer state.

The flattening process after the formation of the first layer (L1) of the reflection enhancing film 17 is typically performed in a state of a semiconductor wafer in which plural drive substrates 10 are arranged. The reason for this is that the flattening process performed in the state of the semiconductor wafer in which the plural drive substrates 10 are arranged on the same plane, preferably avoids unevenness of a flattened level per drive substrate 10 more reliably than the processing of flattening performed on an individual chip.

Subsequently, a dielectric having a higher refractive index than $SiO_2$ is stacked on the flattened top surface of the $SiO_2$ film (L1) by vacuum vapor deposition, for example. An example of material having a higher refractive index than $SiO_2$ is silicon nitride ($Si_3N_4$). The surface of the $Si_3N_4$ film (L2) conforms to the surface configuration of the $SiO_2$ film, which is flat without projections. Another example of material having a higher refractive index than $SiO_2$ may be titanium dioxide ($TiO_2$) or tantalum pentoxide ($Ta_2O_5$). Alternatively, the material may be determined as appropriate depending on the wavelength of the signal light incident on or reflected off the LCOS device or the required characteristics.

An assembly of dielectric films, which is a set of a low dielectric film of $SiO_2$ (L1) and a high dielectric film of $Si_3N_4$ (L2), is repeatedly stacked from L1 to L10 to form the reflection enhancing film 17. The tenth layer (L10) in the reflection enhancing film 17 has a flattened surface, not conforming to the uneven surface of the pixel region 11 (the lower layer) only provided with the pixel electrodes 14, since the surface of the $SiO_2$ film as the first layer (L1) is flattened. While the present embodiment is illustrated with the reflection enhancing film 17 including the five assemblies of the dielectric films from L1 to L10, the number of the stacked layers may be determined as appropriate depending on the preferred reflectance.

As an example of the thicknesses of the dielectric films in the assembly, when a targeted wavelength $\lambda_0$ for increasing the reflectance is 350 nm, the thickness of the low dielectric film of $SiO_2$ is $(\lambda/4)/nd1=(350/4)/1.48=59.10$ nm when the refractive index nd1 of the low dielectric film of $SiO_2$ is 1.48, and the thickness of the high dielectric film of $Si_3N_4$ is $(\lambda/4)/nd2=(350/4)/2.10=41.60$ nm when the refractive index nd2 of the high dielectric film of $Si_3N_4$ is 2.10.

With regard to the number of the stacked dielectric films included in the reflection enhancing film 17, five or more assemblies of the dielectric films (ten or more layers) are used so as to achieve particularly high reflection enhancing effects. The total thickness for achieving the reflection enhancing effects with the signal light including a visible range of wavelengths needs to be 0.5 µm or greater. For example, when five assemblies of the dielectric films are stacked, and each assembly is a set of the $SiO_2$ film having a thickness of 94 nm and the $Si_3N_4$ film having a thickness of 65 nm so as to enhance the reflectance in the band of green of 550 nm, the total thickness of the film formed is about 0.8 µm.

In particular, the $SiO_2$ film as the first layer (L1) in the reflection enhancing film 17 is formed having a thickness of $\lambda/4$ of an intermediate wavelength $\lambda_c$ from the shortest wavelength to the longest wavelength in the wavelength band of the signal light SL. For example, when the intermediate wavelength $\lambda_c$ is 550 nm, the thickness of the $SiO_2$ film as the first layer (L1) is set to result in 75 nm after the flattening process.

Subsequently, four assemblies of the dielectric films (four sets: a set of L3 and L4, a set of L5 and L6, a set of L7 and L8, and a set of L9 and L10), each including the low dielectric film of $SiO_2$ and the high dielectric film of $Si_3N_4$, are sequentially stacked from L3 to L10 on the top surface of the assembly of the dielectric films as a set of the $SiO_2$ film (L1) and the $Si_3N_4$ film (L2) subjected to flattening, so as to form the reflection enhancing film 17 in the same manner as the conventional case. While the present embodiment is illustrated with the thin film of the reflection enhancing film 17, in which the five assemblies of the dielectric films are stacked, the number of the stacked layers may be determined as appropriate depending on the preferred reflectance.

As a comparative example, the conventional case uses a reflection enhancing film including layers each having a thickness according to a targeted wavelength $\lambda_0$. In particular, when the targeted wavelength $\lambda_0$ of the signal light SL is 350 nm, the thickness of the $SiO_2$ film as the first layer of the reflection enhancing film 17 is 59 nm so as to correspond to the wavelength of 350 nm. Thereafter, the five assemblies of the dielectric films are stacked together while the thickness of the $Si_3N_4$ films of the high dielectric films is set to 41 nm, and the thickness of the $SiO_2$ films of the low dielectric films is set to 59 nm. In this case, the entire reflection enhancing film 17 can achieve a reflectance of 98% at the wavelength $\lambda_0$ of 350 nm of the signal light SL.

If the targeted wavelength $\lambda_0$ is changed from 350 nm to 550 nm in the conventional case, the $SiO_2$ film as the first layer (L1) needs to be formed to have a thickness of 94 nm during the semiconductor manufacture process. A high reflectance cannot be achieved unless the thickness of the $Si_3N_4$ films of the high dielectric films is changed to 65 nm and the thickness of the $SiO_2$ films of the low dielectric films is changed to 94 nm in the following layers from the second layer (L2).

Figure 4:
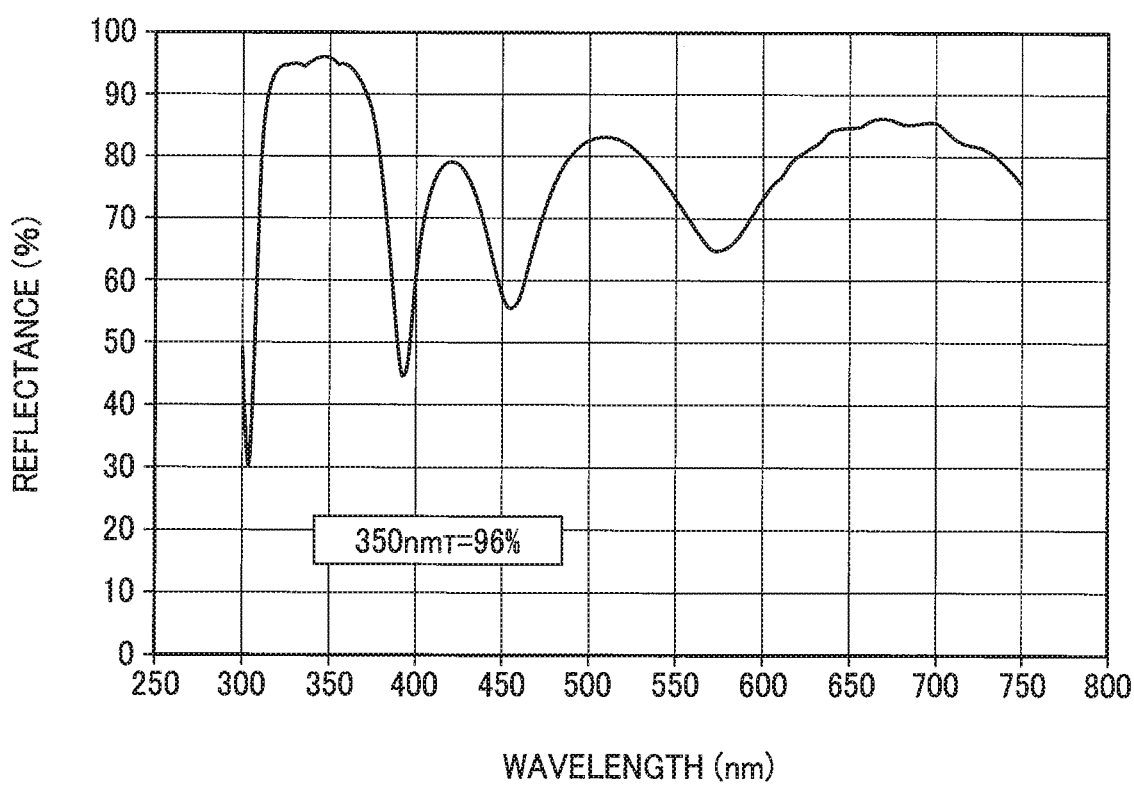
FIG. 4 is a graph showing an example of spectral reflectance characteristics of the reflection enhancing film obtained in the present embodiment.

In contrast, since the $SiO_2$ film as the first layer (L1) according to the embodiment of the present disclosure has already been subjected to flattening so as to have a thickness set to 75 nm in accordance with the intermediate wavelength $\lambda_c$ of 550 nm, the thickness of the $Si_3N_4$ films of the high dielectric films and the thickness of the $SiO_2$ films of the low dielectric films are only required to be changed to 65 nm and 94 nm, respectively, in the following layers from the second layer (L2), so as to achieve 96% of the reflectance of the entire reflection enhancing film 17. FIG. 4 shows spectral reflectance characteristics of the reflection enhancing film actually manufactured. Namely, a high reflectance can be achieved without the thickness of the first layer (L1) changed.

Setting the thickness of the first layer (L1) (for example, 75 nm) in accordance with the intermediate wavelength $\lambda_c$ in the preliminarily-presumable band of the signal light SL in the band from near ultraviolet light to near infrared light, can provide the reflection enhancing film 17 having a high reflectance by stacking the low dielectric films and the high dielectric films in the following layers from the second layer, each having a thickness set in accordance with the targeted wavelength $\lambda_0$, regardless of whether the targeted wavelength $\lambda_0$ is changed.

The present embodiment can be applied to a case in which the signal band of the signal light SL is an infrared band of 1200 nm to 1700 nm. In particular, the thickness of the low dielectric film of $SiO_2$ as the first layer (L1) of the reflection enhancing film 17 in which the intermediate wavelength $\lambda_c$ is 1450 nm, may be set to $(1450/4)/1.48=244$ nm. Thereafter, the high dielectric films and the low dielectric films with the respective thicknesses set in accordance with the targeted wavelength $\lambda_0$ may be stacked on one another.

According to the structure of the reflection enhancing film 17 of the optical switching device according to the embodiment, the dielectric film as the first layer has a thickness (optical thickness $\lambda/4$) set to achieve the reflection enhancing effects at about the intermediate wavelength in the presumable wavelength band of the signal light SL, so that the thicknesses of the dielectric films after the second layer can each be set in accordance with the targeted wavelength. The reflection enhancing film 17 having a high reflectance in the targeted band can be formed accordingly. In other words, stacking the dielectric films of the reflection enhancing film 17 after the second film with the thicknesses set in accordance with the targeted wavelength $\lambda_0$, facilitates the formation of the reflection enhancing film 17 having a high reflectance, even if the targeted wavelength $\lambda_0$ is changed, so as to prevent degradation of the performance of the optical switching device.

The structure of the reflection enhancing film 17 in the optical switching device according to the embodiment can prevent scattering or diffraction of the signal light SL incident on or reflected off the LCOS device due to the flattened surface of the reflection enhancing film 17, so as to achieve the reflective characteristics of the reflection enhancing film 17 identical to an optical simulation, preventing degradation of the performance of the optical switching device.

It should be understood that the present disclosure is not intended to be limited to the above embodiment, and various modifications can be made within the scope of the present disclosure. For example, a change in the number of the sets of the dielectric films to ten (twenty layers) may be made depending on the required characteristics in order to allow the signal light to be reflected in a narrower band.

The LCOS device, when used as the optical switching device according to the present embodiment, can easily ensure the reflection enhancing film having a high reflectance, even if a targeted wavelength of a signal light is changed, so as to keep the performance of the optical switching device.

What is claimed is:

1. An optical switching device comprising:
    a drive substrate including a pixel region including a plurality of pixel electrodes, an outer circumferential region arranged at an outer circumference of the pixel region, and a seal region;
    a transparent substrate including a counter electrode;
    a liquid crystal layer interposed between the drive substrate and the transparent substrate; and
    a reflection enhancing film arranged on the pixel region, the outer circumferential region, and the seal region, wherein the reflection enhancing film includes at least one assembly of dielectric films to be stacked, each assembly being a set of two dielectric films having different refractive indexes, and the dielectric film as a first layer in the reflection enhancing film has a different thickness from other dielectric films,
    wherein the respective dielectric films having an identical refractive index have an identical thickness except for the dielectric film as the first layer included in the reflection enhancing film.

2. The optical switching device according to claim 1, wherein the dielectric film as the first layer included in the reflection enhancing film is subjected to flattening.

\* \* \* \* \*